United States Patent [19]
Houston

[11] Patent Number: 5,211,925
[45] Date of Patent: May 18, 1993

[54] METHOD FOR REMOVING NITROGEN OXIDES FROM AN IMPURE AIR STREAM IN AN INCINERATOR

[76] Inventor: Reagan Houston, 252 Foxhunt La., Hendersonville, N.C. 28739

[21] Appl. No.: 834,131

[22] Filed: Feb. 11, 1992

[51] Int. Cl.$^5$ .............................................. C01B 21/00
[52] U.S. Cl. ................................................... 423/235
[58] Field of Search .................... 423/235, 235 D, 351

[56] References Cited
U.S. PATENT DOCUMENTS

| | | | |
|---|---|---|---|
| 3,873,671 | 3/1975 | Reed et al. | 423/235 |
| 3,900,554 | 8/1975 | Lyon | 423/235 |

Primary Examiner—Gregory A. Heller
Attorney, Agent, or Firm—Lyman R. Lyon; David M. Carter

[57] ABSTRACT

A method for removing nitrogen oxides $NO_x$ and volatile organic combustibles VOC's from impure air or gases is provided. The method includes the steps of admixing ammonia or other reducing gas to the feed of an incinerator, heating the gas to about 1000° F., reacting the $NO_x$ with the reducing gas to form nitrogen gas and water, and further heating the gas to oxidize the VOC's and residual reducing gas with the oxygen present.

5 Claims, 1 Drawing Sheet

METHOD FOR REMOVING NITROGEN OXIDES FROM AN IMPURE AIR STREAM IN AN INCINERATOR

BACKGROUND OF THE INVENTION

1. Field of the Invention

The invention concerns a method for removing nitrogen oxides and volatile organic compounds, VOC's, from impure air feeding through an incinerator.

2. Description of the Prior Art

Exhaust gases from diesel engines, gas turbines, and many combustion processes contain undesirable amounts of $NO_x$ and VOC's. The environment is now becoming more extensively exposed to the uncontrolled release of these materials into the air. $NO_x$, for example, contributes to eye irritating smog and to acid rain formation.

By present technology $NO_x$ formation can be reduced simply by lowering the combustion temperature, or by changing process conditions away from the most efficient point, or by similar expensive procedures. There are costly processes for injecting ammonia into flue gas at a particular temperature. Selective reduction catalysts are available, but they do not also remove VOC's and residual ammonia. U.S. Pat. No. 4,087,250 uses gaseous ammonia for exothermic reaction with nitric oxides in the exhaust gas as it passes through catalyst beds. U.S. Pat. Nos. 4,188,364, 4,246,234, and 4,571,329 each concern a method of reducing nitrogen oxide by reaction over a catalyst. U.S. Pat. No. 4,878,442 concerns a method of removing nitrogen oxides from waste gas by igniting the oxides with carbonaceous material in the presence of air.

It is therefore an object of the present invention to provide a method that overcomes the disadvantages of conventional methods for removing nitrogen oxides from impure air.

This and other objects, features and advantages of the invention will be apparent from the accompanying drawing FIGS. 1 and 2 and the following description.

SUMMARY OF THE INVENTION

The invention in a preferred embodiment concerns a method for removing nitrogen oxide gas from an impure air stream feeding through an incinerator. The method comprises admixing a quantity of reducing gas with the feed stream, heating the resulting gas mixture to temperatures sufficient to convert the $NO_x$ gas to nitrogen gas and water, and further heating the gas mixture to higher temperatures to air oxidize any excess reducing gas or VOC's present in the resulting $NO_x$-free gas stream prior to release of said stream to the atmosphere. As the feed gas is heated through the temperature range of about 1000° to 1400° F., the reducing gas will react with $NO_x$ to form nitrogen gas and water, as indicated. Further heating to about 1500° F. will air oxidize the remaining reducing gas. It may be desirable to add air or oxygen to the impure gas stream. The reducing gas can be any one or more of CO, methanol, ethanol, hydrogen, urea, ammonia, and ammonium hydroxide. The reducing gas can also be reformed natural gas made, for example, by mixing natural gas with steam and passing the mixture over a hot reforming catalyst, a well known procedure. Preferably, the quantity of reducing gas employed should be at least sufficient for complete conversion of the $NO_x$ gas to nitrogen gas and water or should be in excess of that quantity. Since $NO_x$ is typically present in small amounts such as 0.1%, only a small amount of reducing gas is required. The maximum temperature for the incinerator should be below 1800° to 2000° F. so that the nitrogen gas present in the gas stream is not oxidized to $NO_x$. Ammonia is not as reactive as some reducing gases such as hydrogen gas. However, as ammonia or ammonium hydroxide is heated in the range of 900° to 1200° F., dissociation or cracking will occur to liberate hydrogen gas and nitrogen gas. This cracking will occur at a lower temperature if a suitable catalyst is present such as a mixed oxide of iron oxide and chromium oxide. In one preferred embodiment, the incinerator comprises a reversing regenerator as described hereinafter where the catalyst can be readily positioned at the correct temperature location in the packing of the regenerator.

The typical reactions for removing $NO_x$ are:

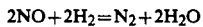

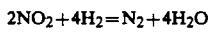

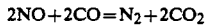

The invention in a preferred aspect concerns the method where the incinerator comprises a thermal regenerator system. The system includes a first bed of packing which is cool at one end and hot at the other, a combustion chamber connected to the hot end of the first bed, a second bed of packing which is cool at one end and hot at the other end with its hot end connected to the combustion chamber. The system also includes valve means for feeding impure gas containing air and nitric oxides into the cold end of either bed, and valve means for removing treated gas from the alternate bed, means for feeding ammonia into the impure gas, means for heating the combustion chamber to at least 1400° F., and control means for the valves so that impure gas can be fed alternately to either of said beds through the combustion chamber and out the other bed. Optionally, the regenerator system includes a third bed of packing having a hot end and a cold end which hot end is connected to the combustion chamber and the cold end connected to the valve means, and valve means for controlling the valves such that one bed is first heating the feed gas, then being purged with pure gas, and then cooling treated gas from the combustion chamber.

The invention in another preferred embodiment concerns the described method where the incinerator comprises a heat exchanger instead of a thermal regenerator. The heat exchanger includes a cold inlet, a hot outlet, a hot inlet, and a cold outlet. A combustion chamber is connected between the hot outlet of the heat exchanger and the hot inlet; the chamber includes a burner for heating the chamber to at least 1400° F. The system also includes an inlet conduit for the impure gas connected to the cold inlet, a second conduit for adding reducing gas to the first conduit, and a third conduit for removing treated gases from the cold outlet of the heat exchanger.

BRIEF DESCRIPTION OF THE DRAWINGS

As shown in FIG. 1, the system includes thermal regenerators 10A, 10B with cool ends 16A, 16B and hot ends 17A, 17B, a combustion chamber 11, a burner 12, a burner fuel supply line 13, packing beds 14A, 14B, and catalyst beds 15A, 15B. The system further includes an impure air feed line 20, a reducing gas feed line 30, a reversing valve 40, and a $NO_x$-free air exit line 50.

In operation, the impure air stream is introduced via the feed line 20 while the reducing gas stream is introduced via the feed line 30. The lines join, and the gases are mixed. The gas stream mixture passes through the reversing valve 40 which is in a position set for directing the gas stream into regenerator 10A via its cool end port 16C. The gas stream then rises through the packing beds 14A and catalyst bed 15A causing the stream to be heated to an increasingly higher temperature. The stream then passes via the hot end port 17A through the combustion chamber 11 into the second regenerator 10B via the hot end port 17B where it further passes through the packing beds 14B and catalyst bed 15B, and finally leaves the regenerator via the cool end port 16B and is led away as a $NO_x$-free and VOC-free air stream via the transit line 18B, valve 40, and exit line 50 to the atmosphere.

Figure 1:
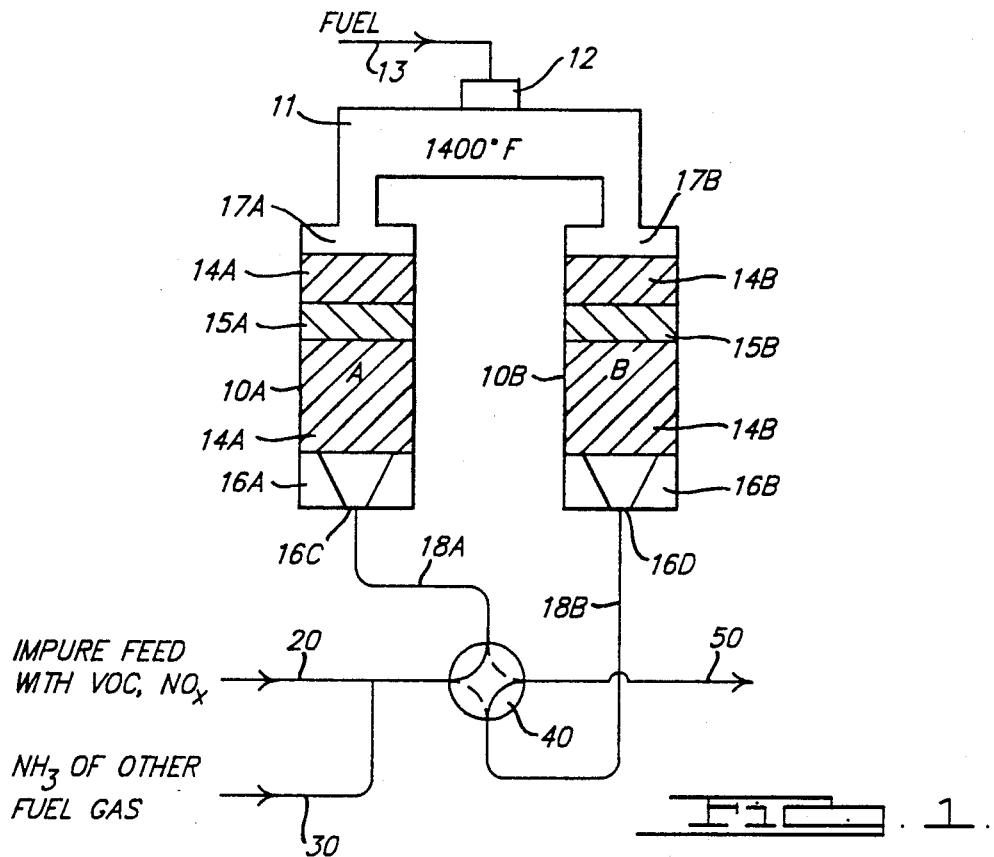
FIG. 1 is a diagrammatic view of a preferred apparatus embodiment of the invention including a thermal regenerator system for removing $NO_x$ from an impure air stream passing through an incinerator.

The thermal reactions which take place and thereby purify the air stream during the above transit of the air stream are as described hereinabove. To regenerate the column 10B after a suitable period of operation, the valve 14 is advanced clockwise to the position shown in dotted outline so that the air stream will flow first via transit line 18B and cool end port 16D through regenerator 10B, then the combustion chamber and the regenerator 10A, after which the air stream leaves the system via the cool end port 16C and transit line 18A through the valve 40 and $NO_x$-free and VOC-free air exit line 50. With two switching regenerators, as shown in FIG. 1, about 80 to 85% of the VOC and $NO_x$ can be removed. With a 3-bed switching regenerator, not shown but which may be conventional per se, removal efficiencies of over 95% are expected.

Figure 2:
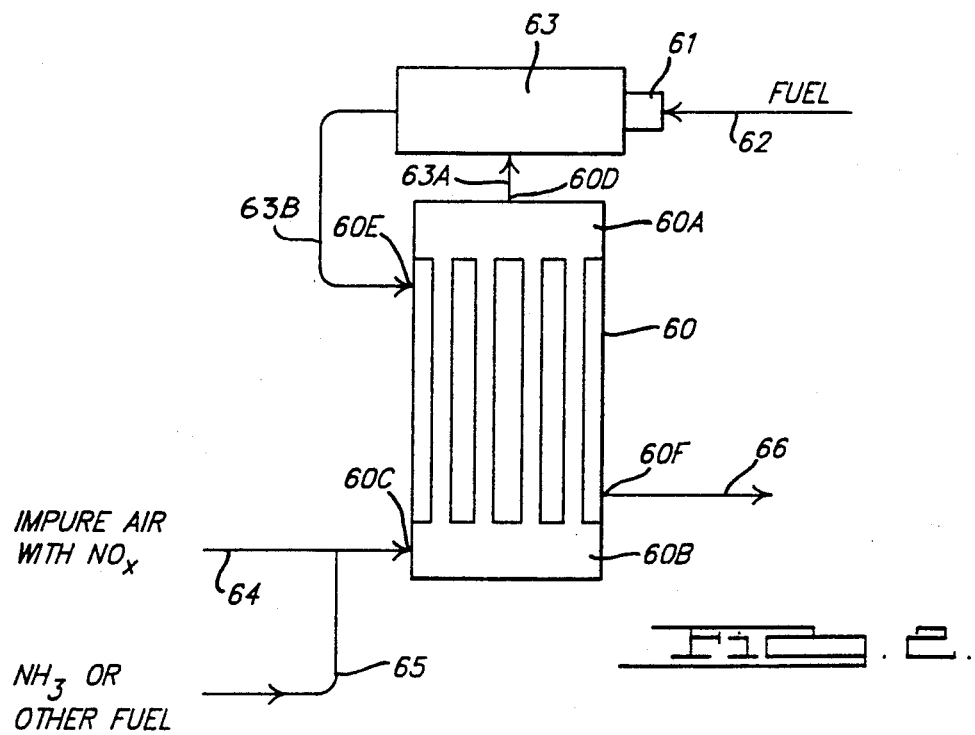
FIG. 2 is a similar view of a preferred system embodiment including a heat exchanger.

As shown in FIG. 2, the system includes a heat exchanger 60 with a hot end 60A, a cool end 60B, a cool inlet port 60C, a hot outlet 60D, a hot inlet 60E, and a cool outlet 60F. It further includes a burner 61, a burner fuel supply line 62, a combustion chamber 63, a feed line 63A, an impure air feed line 64, a reducing gas feed line 65, and a $NO_x$-free and VOC-free air exit line 66.

In operation, the impure air stream is introduced via the feed line 64 while the reducing gas stream is introduced via the feed line 65. The lines join, and the gases are mixed and pass into the heat exchanger 60 via the cool inlet 60C and cool end 60B. The gas stream rises through the exchanger causing the gas to become increasingly hotter as it rises to the hot end 60A from which it leaves via the hot outlet 60D and the feed line 63A into the combustion chamber 63. The gas stream then passes through the chamber, re-enters the heat exchanger via the feed line 63B and the hot inlet 60E. It then passes through and exits the exchanger via the cool outlet 60F and the $NO_x$-free and VOC-free air line 66 to the atmosphere. Thus, removal of the $NO_x$ gases is expected to be above 95% by means of the heat exchanger system.

Having thus described my invention, what is desired to claim as my exclusive privilege and property is the following.

I claim:

1. A method of removing nitrogen oxide gas $NO_x$ from an impure air stream feeding through an incinerator at a first temperature, comprising admixing a quantity of reducing gas with said feed stream at the first temperature, heating the resulting gas mixture to a second temperature in the range from 1000° to 1400° F. to convert the $NO_x$ gas to nitrogen gas and water, and further heating the gas mixture to a third temperature in the range from 1500° F. to 1800° F. to air oxidize any excess reducing gas or volatile organic combustibles present in the resulting $NO_x$-free gas stream prior to release of said stream to the atmosphere.

2. A method according to claim 1 where the reducing gas is a gas or mixture of gases selected from CO, methanol, ethanol, hydrogen, urea, ammonia, and ammonium hydroxide.

3. A method according to claim 1 where the reducing gas is reformed natural gas comprising steam, CO, hydrogen, and unreacted hydrocarbons.

4. A method according to claim 1 where the admixed quantity of reducing gas is at least sufficient for complete conversion of the $NO_x$ gas to nitrogen gas and water.

5. A method according to claim 1 where the admixed quantity of reducing gas is in excess of that required for complete conversion of the $NO_x$ gas to nitrogen gas and water.

* * * * *